United States Patent [19]

Sipple

[11] 4,176,402
[45] Nov. 27, 1979

[54] APPARATUS FOR SIMULTANEOUSLY MEASURING A PLURALITY OF DIGITAL EVENTS EMPLOYING A RANDOM NUMBER TABLE

[75] Inventor: Ralph E. Sipple, Shoreview, Minn.

[73] Assignee: Sperry Rand Corporation, New York, N.Y.

[21] Appl. No.: 908,886

[22] Filed: May 24, 1978

[51] Int. Cl.$^2$ .................... G11C 27/02; G06F 3/04
[52] U.S. Cl. ............................................ 364/900
[58] Field of Search ... 364/200 MS File, 900 MS File, 364/550, 551, 554, 717; 235/92 DE, 92 ST

[56] References Cited

U.S. PATENT DOCUMENTS

| | | | |
|---|---|---|---|
| 3,582,882 | 6/1971 | Titcomb et al. | 364/717 X |
| 3,582,901 | 6/1971 | Cochrane et al. | 364/900 |
| 3,588,837 | 6/1971 | Rash et al. | 364/200 |
| 3,731,279 | 5/1973 | Halsall et al. | 364/200 |
| 3,740,724 | 6/1973 | Snyder | 364/200 |
| 3,829,841 | 8/1974 | Steinberg | 364/200 |
| 4,001,785 | 1/1977 | Miyazaki et al. | 364/900 |
| 4,041,468 | 8/1977 | Perry et al. | 364/900 |
| 4,085,444 | 4/1978 | Schneider | 364/900 |
| 4,091,456 | 5/1978 | Ehresman et al. | 364/900 |

OTHER PUBLICATIONS

R. L. Mitchell, et al., "Table-Lookup Methods for Generating Arbitrary Random Numbers" in *IEEE Transactions on Computers*, vol. C-26, No. 10, Oct. '77, pp. 1006-1008.

Primary Examiner—Melvin B. Chapnick
Attorney, Agent, or Firm—John L. Rooney; Kenneth T. Grace; Marshall M. Truex

[57] ABSTRACT

Apparatus for measuring the rate of occurrence and duration of digital events through the technique of multiple sampling at times random to the occurrence of the digital events. The digital events to be sampled are represented as the presence or absence of binary ones or zeroes that can be sensed in a subject conductor at a given point in time. Since the probability of sensing a binary state of true or false at any particular but randomly determined time is a function of the duty cycle, sensing the binary state of or sampling a given digital event a given number of times produces a correspondingly statistically significant measure of the duty cycle of the digital event. The greater the number of samples, the greater the confidence in the measure of the duty cycle. The number of samples necessary to evoke a given confidence level is determined through the use of basic statistics. The point in time at which sampling occurs must be random to permit statistical validity. Though true randomness may be philosophically unattainable, randomness for sampling purposes is achieved through reading a random number table stored within a programmable read only memory (PROM) in response to a time standard running synchronously to the occurrence of the digital events to be sampled. Each entry from the random number table determines whether sampling will occur when it is read from the PROM. The binary state of each subject conductor is recorded at the sampling time as an increment to a counter or increment to the contents of an addressable location in a random access memory (RAM).

4 Claims, 5 Drawing Figures

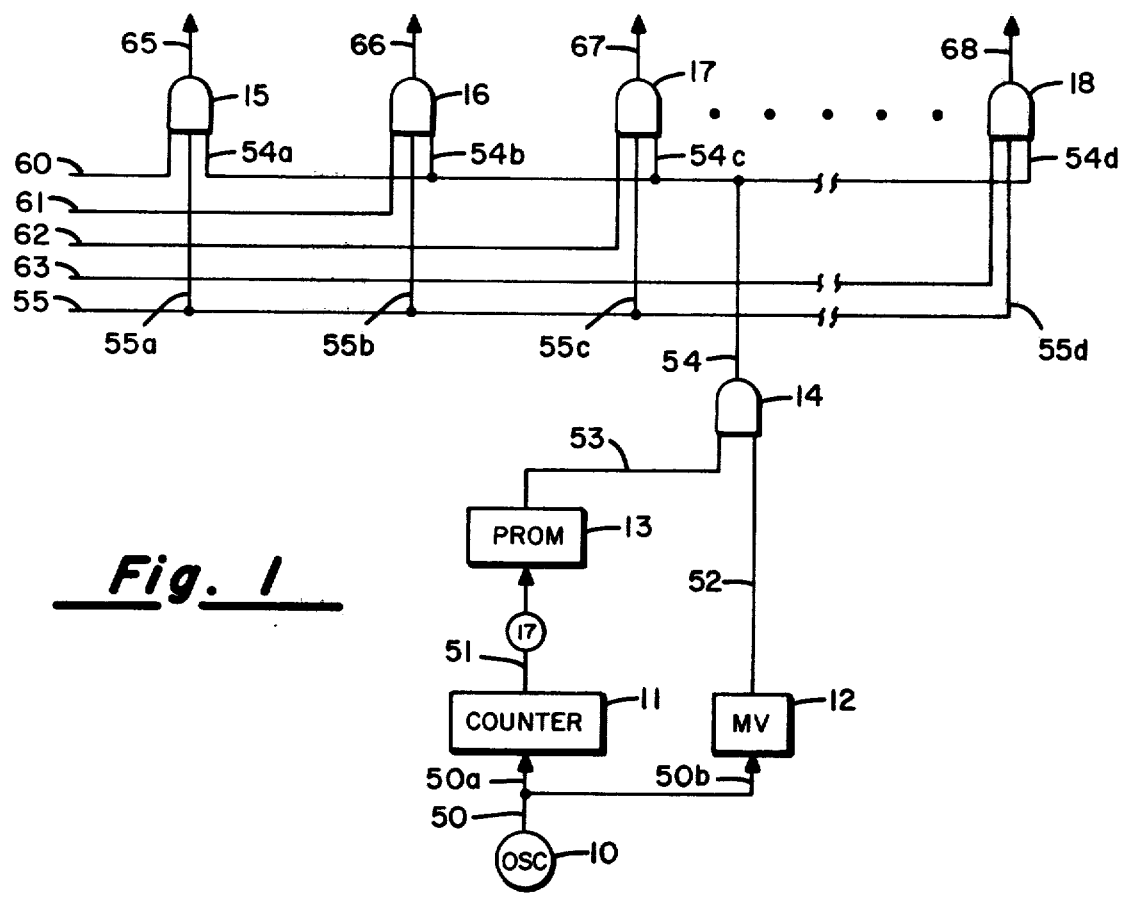
_Fig. 1_
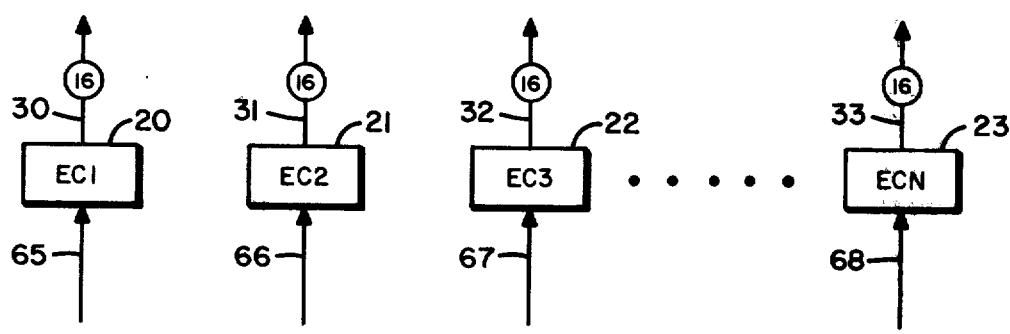
_Fig. 3_

APPARATUS FOR SIMULTANEOUSLY MEASURING A PLURALITY OF DIGITAL EVENTS EMPLOYING A RANDOM NUMBER TABLE

BACKGROUND OF THE INVENTION

It is often desirable in digital systems and particularly in digital data processing systems to measure the rate of occurrence and/or duration of occurrence of digital events. In this context a digital event is sensed as a binary state of true or false within a subject conductor. If one considers the rate of occurrence and duration of occurrence together as integrated over time, the measure may be termed duty cycle. The measurement of duty cycle of a digital event is as satisfactory as separate measurements of rate of occurrence and duration of occurrence when only a relative measurement is needed and either rate of occurrence or duration of occurrence is fixed or well known. Furthermore, in many cases, measurements of rate of occurrence and duration of occurrence are desirable only to compute duty cycle.

Rate of occurrence, duration of occurrence, and duty cycle of digital events may all be measured directly. This normally involves measuring in a fashion which is synchronous to occurrence of the digital events. For digital data processing systems this has taken the form of software measurement. This technique has two basic disadvantages. First, to be measured, a digital event must be capable of being sensed by software. This sensing is, of course, indirect and is usually limited to digital events which are synchronous to execution of computer instructions. The second disadvantage of software measurement is the time penalty to be paid. The execution of instructions to perform the measurements may consume a considerable portion of the digital data processing system's capacity.

An alternate method of synchronously measuring rate of occurrence and duration of occurrence of digital events is through use of special purpose dedicated hardware. This method is currently most popular because of the disadvantage of software measurement as mentioned above. This method finds its greatest applicability to digital events whose rate of occurrence is relatively small in relation to the measurement period and whose duration of occurrence is either very long or very short relative to the measurement period. Whereas these restrictions are not intrinsically required by the measurement method, the amount of hardware required to perform these measurements is usually large enough to force these restrictions. A further disadvantage of synchronously measuring rate of occurrence and duration of occurrence is that integration of these quantities over the measurement period is required if measurement of duty cycle is desired.

Ross D. Rash, et al, in U.S. Pat. No. 3,588,837, disclose a method of measuring digital events based upon sampling. Hardware in the Rash Patent senses or samples the binary state of the subject conductor at times intended to be random to the expected occurrence of the digital event. By sampling the subject conductor a statistically significant number of times, a measure of duty cycle is obtained. The confidence level of that measurement is easily determined using techniques of elementary statistics. The reader might find review of the subject helpful through the use of a text such as, Morris Hamburg, Basic Statistics, (Harcourt, Brace, Jovanovich, Inc., 1974).

The present invention also utilizes a sampling technique to derive the measure of duty cycle. Unlike the Rash Patent, however, the present invention does not rely upon the use of an asynchronous sampling clock to provide samples taken randomly in time. The present invention incorporates a random number table stored within a programmable read only memory (PROM) to ensure randomness and correspondingly reduce the error resulting from such lack of randomness. Also, unlike the Rash Patent, the present invention samples multiple subject conductors simultaneously to overcome the speed disadvantages of the sequential sampling in Rash. This permits measurement of rate of simultaneity of digital events in multiple subject conductors.

SUMMARY OF THE INVENTION

The present invention senses or samples the binary state of each subject conductor at times effectively random to the occurrence of digital events (i.e., binary state of true or false sensible in each subject conductor). The time at which a sample is to be taken is determined by a random number table stored within a programmable read only memory (PROM). The PROM is sequentially accessed in response to an oscillator (i.e., each cycle of the oscillator causes the next sequential addressable location to be read). If access to the PROM results in a binary one, a sample is taken. If access to the PROM results in a binary zero, no sample is taken. The oscillator operates synchronously with the internal master clock in the device containing the subject conductors. This permits the measurements to be sufficiently random to provide statistically determinable results but be synchronous to the internal master clock driven digital events, thereby minimizing errors caused by sampling during internal master clock driven changes of state in the subject conductor. Operating the sampling oscillator synchronously with the internal master clock also promotes ease of recording and utilization of measurement data.

Each sample taken reveals the subject conductor to be at a binary state of true or false. Two methods of recording the sample are described. For sampling a relatively small number of subject conductors, a counter is assigned corresponding to each subject conductor. For each sample taken wherein the subject conductor is at a binary state of true, the corresponding counter is incremented (i.e., one is added to the contents of the counter). For each sample taken wherein the subject conductor is at a binary state of false, the corresponding counter is not incremented (i.e., zero is added to the contents of the counter). For larger numbers of subject conductors the cost of individual counters may get too large. In that case a random access memory (RAM) is used with each addressable location in the RAM corresponding to one subject conductor. The count for each subject conductor is retained in the corresponding addressable location within the RAM. For each sample taken wherein the subject conductor is at a binary state of true the contents of the corresponding addressable location within the RAM is incremented. For each sample taken wherein the subject conductor is at a binary state of false, the contents of the corresponding addressable location within the RAM is not incremented.

Using either scheme of accumulating the data, samples are taken for some finite period of time. The total count in any counter or addressable location within the RAM represents the number of times the corresponding subject conductor was at binary state of true when a sample was taken. Since the probability of any one sample being at a binary state of true is directly dependent upon the duty cycle, the count in any counter or addressable location within the RAM is a statistical measure of the duty cycle (and hence the rate of occurrence and duration of occurrence) of the digital events within the corresponding subject conductor. The greater the number of samples taken, the higher the confidence in the measurement as determined by elementary statistics. Furthermore, the counts derived from different subject conductors may be correlated if measurement of coincidence is desired.

BRIEF DESCRIPTION OF THE DRAWINGS

FIG. 1 shows the basic sampling element.

FIG. 3 shows counters used to accumulate the measurement data.

DETAILED DESCRIPTION OF THE PREFERRED EMBODIMENTS

The present invention may be considered to contain two major elements. The first is the sampling element shown in FIG. 1 with timing described by FIG. 2. The second element is the data recording element which is shown as two alternative embodiments by FIG. 3 and FIG. 4. The sampling element is described first followed by descriptions of the two embodiments of the data recording element.

Figure 2:
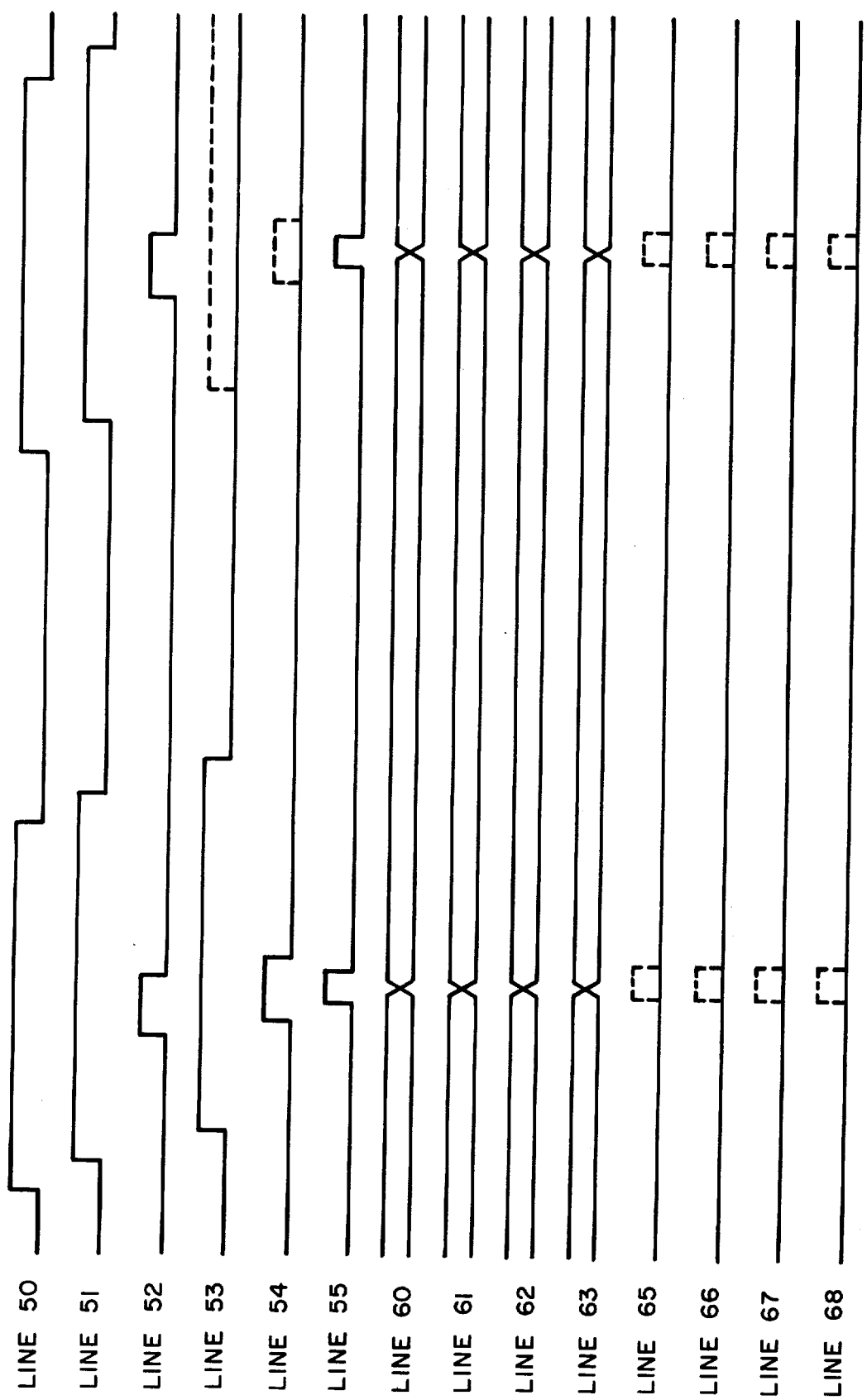
FIG. 2 shows the timing of the basic sampling element.

Referring to FIG. 1, the subject conductors to be sampled are shown as lines 60, 61, 62 and 63. Four subject conductors are shown although those skilled in the art appreciate the application of the present invention to a different number of subject conductors. Line 55 supplies an internal master clock signal from the device containing the subject conductors. The generation and use of such a clock signal is extremely common to sequential digital machines. The sampling oscillator, OSC 10, operates synchronously to the internal master clock signal on line 55. As can be seen from FIG. 2, the output of OSC 10 (i.e., line 50) and the internal master clock signal (i.e., line 55) are in synchronism. There are many common methods of achieving this synchronism. OSC 10 may be controlled by the same time standard (e.g., crystal) as the internal master clock; OSC 10 may be a blocking oscillator or simple multivibrator circuit with the internal master clock signal as an input (not shown). It is not important which common method is used to achieve this synchronism, but the internal master clock signal at line 55 and the output of OSC 10 at line 50 must be synchronous as shown by FIG. 2 to properly practice the present invention.

The output of OSC 10 at line 50 provides an input to counter 11 via line 50a. See FIG. 1. Counter 11 is a 17-bit counter in the preferred embodiment although other widths (i.e., fewer than 17 bits or more than 17 bits) can be used. Each high received from OSC 10 via line 50a causes counter 11 to be incremented (i.e., one is added to contents). In this manner counter 11 is caused to contain all binary values from zero to $2^{17}-1$ as counter 11 is incremented from zero to $2^{17}-1$ and back to zero by the positive pulses received via line 50a. The contents of counter 11 at any instant is a 17-bit binary value. This 17-bit binary value is coupled to Programmable Read Only Memory, PROM 13, via line 51. PROM 13 contains a random number table of $2^{17}$ binary bits. The random number table may be derived using a variety of mathematical techniques. For the preferred embodiment, a portion of the Random Number Table, Table 6-1, at page 121 of Basic Statistics by Morris Hamburg (1974, Harcourt, Brace, Jovanovich, Inc.) was converted from decimal to binary and written into PROM 13. Each of the $2^{17}$ binary bits of PROM 13 is individually addressable by the contents of counter 11 via line 51. In this manner, each high received by counter 11 via line 50a causes the contents of counter 11 to be incremented. This causes the next bit of the random number table of PROM 13 to be addressed and transferred to AND 14 via line 53.

The output of OSC 10 is also transferred to multivibrator, MV 12, via line 50b. MV 12 produces a sample gate signal in response to each high received from OSC 10. The sample gate signal produced by MV 12 (transferred via line 52) is of a much shorter duration than the high received from OSC 10. See FIG. 2. This sample gate signal (i.e., output of MV 12) is transferred to AND 14 via line 52. See FIG. 1. The sample gate signal ensures that the output of PROM 13 transferred via line 53 has stabilized before AND 14 is enabled by MV 12 via line 52.

AND 14 transfers via line 54 a sample signal logical output of high at the occurrence of the sample gate signal received via line 52 if and only if a logical one is read from the random number table stored within PROM 13 at the one of $2^{17}$ bit positions being addressed by the 17-bit value contained in counter 11. AND 14 transfers via line 54 a sample signal logical output of low at all times during the occurrence of the sample gate signal received via line 52 and during the occurrence of the sample gate signal received via line 52 if a logical zero is read from the random number table stored within PROM 13 at the one of $2^{17}$ bit positions being addressed by the 17-bit value contained in counter 11. Refer to FIG. 2 to view the relationship of the signals found on lines 50, 51, 52, 53 and 54. A sample is taken each time AND 14 transfers a sample signal via line 54. Referring to FIG. 1, the output of AND 14 is transferred to AND 15 via line 54a, to AND 16 via line 54b, to AND 17 via line 54c, and to AND 18 via line 54d.

AND 15, AND 16, AND 17, and AND 18 are the sampling circuits. They are connected to the subject conductors (i.e., AND 15 to line 60, AND 16 to line 61, AND 17 to line 62, and AND 18 to line 63). As explained above, four subject conductors are shown though the present invention may be practiced using a different number of subject conductors and a corresponding different number of sampling circuits. As shown in FIG. 1, each sampling circuit has three inputs, the subject conductor, the internal master clock and the logical output of AND 14. Table A lists each sampling circuit and specifies the three input lines of each sampling circuit. In each case, the internal master clock signal (received via lines 55a, 55b, 55c and 55d) provides a timing signal which synchronizes the point in time at which the samples are taken. As mentioned above, the internal master clock is synchronous with OSC 10. The sample determination (lines 54a, 54b, 54c and 54d) specifies whether or not a sample will be taken. As discussed above, line 54 (and hence lines 54a, 54b, 54c and 54d) will transfer a sample signal if the corresponding access to the random number table entry in PROM 13 is addressed by the contents of counter 11 is a binary one and will transfer a sample signal if the corresponding entry to the random number table entry in PROM 13 as addressed by the contents of counter 11 is a binary zero. If lines 54a, 54b, 54c and 54d contain a sample signal during the timing signal of the internal master clock (on lines 55a, 55b, 55c and 55d), a sample will be taken.

TABLE A

| SAMPLING CIRCUIT | INTERNAL MASTER CLOCK INPUT | SUBJECT CONDUCTOR | SAMPLE DETERMINATION | OUTPUT |
| --- | --- | --- | --- | --- |
| AND 15 | LINE 55a | LINE 60 | LINE 54a | LINE 65 |
| AND 16 | LINE 55b | LINE 61 | LINE 54b | LINE 66 |
| AND 17 | LINE 55c | LINE 62 | LINE 54c | LINE 67 |
| AND 18 | LINE 55d | LINE 63 | LINE 54d | LINE 68 |

If lines 54a, 54b, 54c and 54d contain a sample signal during the timing signal of the internal master clock (on lines 55a, 55b, 55c and 55d) no sample will be taken. If and only if a sample is taken (i.e., line 54 contains a sample signal during the timing signal of the internal master clock) and a subject conductor is high (logical true) the corresponding sampling circuit (i.e., AND 15, AND 16, AND 17 or AND 18) will set its output high (i.e., line 65, line 66, line 67 or line 68). FIG. 2 provides the time relationship of each of the signals in the sampling element.

As discussed earlier, the data recording element has two preferred embodiments. For relatively small numbers of subject conductors, the embodiment shown in FIG. 3 is employed. For cost reasons, the second embodiment as illustrated in FIG. 4 is employed for relatively large numbers of subject conductors.

The data recording element shown in FIG. 3 involves the use of event counters, EC1 20, EC2 21, EC3 22 and ECN 23. One counter is coupled to the output of each sampling circuit. AND 15 is coupled to EC1 20 via line 65. AND 16 is coupled to EC2 21 via line 66. AND 17 is coupled to EC3 22 via line 67. AND 18 is coupled to ECN 23 via line 68. For each sample taken when a subject conductor is high, the corresponding event counter is incremented (i.e., one is added to the contents). Each event counter records the number of samples taken when the corresponding subject conductor was high. The width (i.e., the number of bit positions) of the event counters may appear somewhat arbitrary. It is the desired confidence level of the measurement which determines the number of samples needed and hence the width of the event counters. The preferred embodiment utilizes 16-bit event counters as providing an acceptable confidence level. Choice of event counter width to achieve a given confidence level may be made through use of elementary statistics as described by Morris Hamburg, Basic Statistics, (Harcourt, Brace, Jovanovich, Inc. 1974). The output lines of the event counters are shown in FIG. 3. EC1 20 transfers its 16-bit output via line 30. EC2 21 transfers its 16-bit output via line 31. EC3 22 transfers its 16-bit output via line 32. ECN 23 transfers its 16-bit output via line 33. A relative measure of the duty cycle of signals on a subject conductor is available by reading the 16-bit value of the corresponding event counter.

Figure 4:
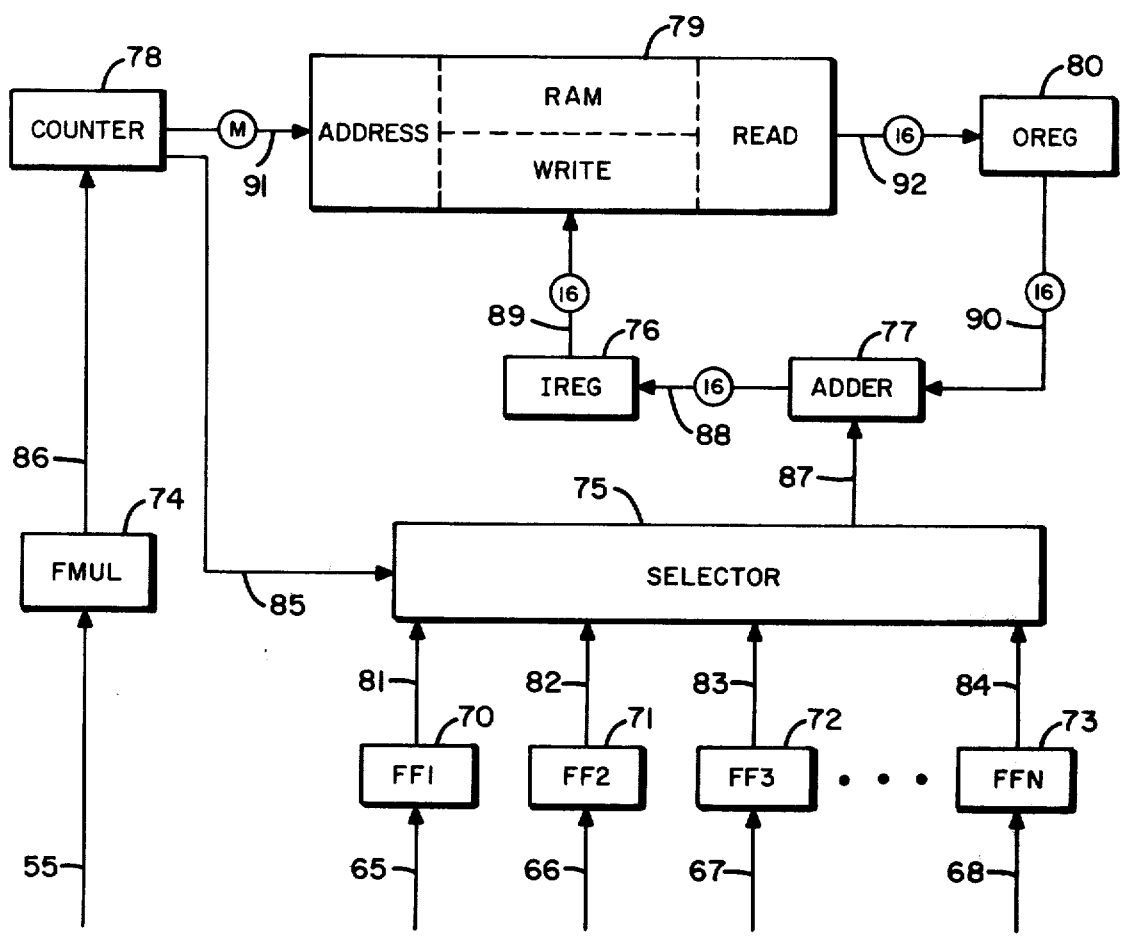
FIG. 4 shows a RAM used to accumulate the measurement data.

FIG. 4 shows the embodiment of the data recording element when relatively many subject conductors are employed. The output of each sampling circuit (i.e., AND 15, AND 16, AND 17 and AND 18) is coupled to a corresponding flip-flop designated FF1 70, FF2 71, FF3 72 and FFN 73 via lines 65, line 66, line 67 and line 68, respectively. The flip-flops (i.e., FF1 70, FF2 71, FF3 72 and FF3 73) hold the results of each sample (i.e., high or low) from the corresponding subject conductor until recorded.

Figure 5:
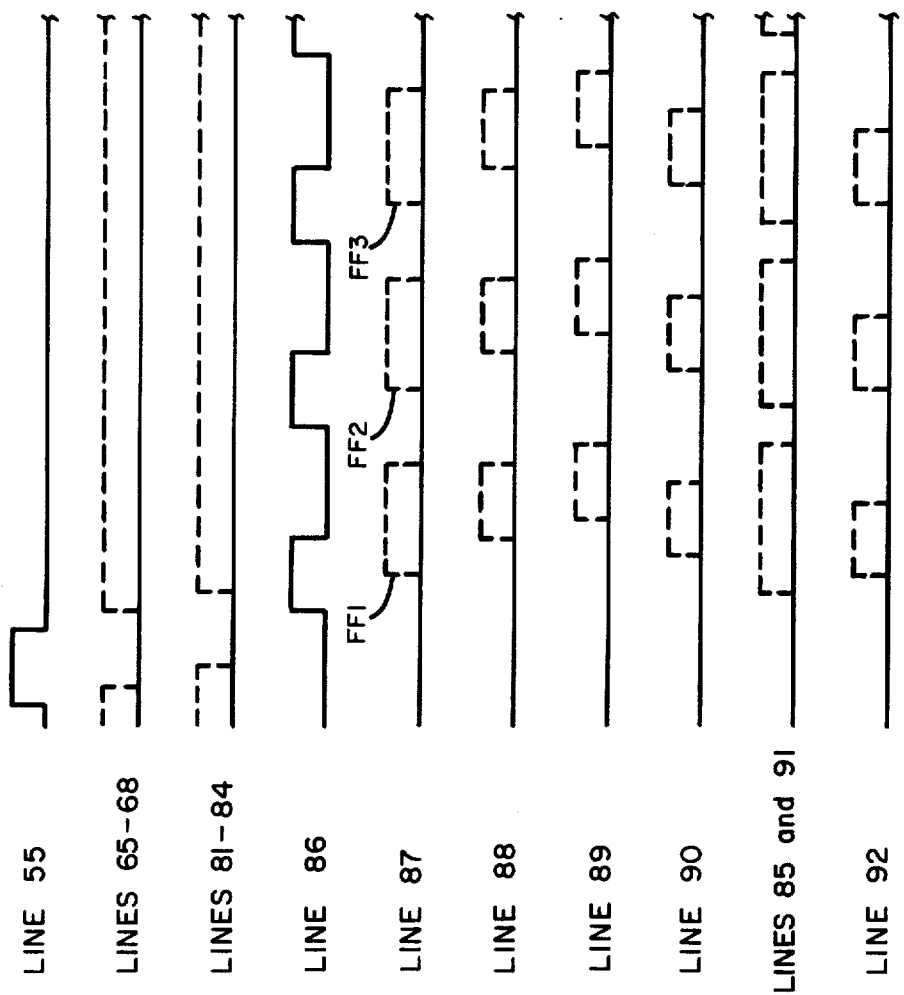
FIG. 5 shows the timing of the embodiment using a RAM to accumulate the measurement data.

The frequency multiplier, FMUL 74, receives the timing signal from the internal master clock via line 55. FMUL 74 produces a number of output pulses corresponding to the number of subject conductors to be sampled. As shown, four subject conductors are sampled. Therefore, FMUL 74 produces and transfers via line 86 four pulses for each timing signal of the internal master clock received via line 55. FIG. 5 shows the relationship between the input via line 55 and the output via line 86 of FMUL 74.

Counter 78 receives the output of FMUL 74 via line 86. See FIG. 4. Counter 78 is incremented (i.e., one is added to the contents of counter 78) for each pulse received via line 86. Counter 78 has a modulus equal to the number of subject conductors to be sampled. For sampling four subject conductors, as shown, counter 78 is a two-bit counter having the capacity of four unique states (i.e., 0, 1, 2 and 3). The output of counter 78 is an M-bit value indicating the contents of counter 78. M is two for sampling four subject conductors as shown. The two-bit content of counter 78 is transferred to random access memory, RAM 79, via line 91 and to Selector 75 via line 85. The time relationship of the input to counter 78 via line 86 and the outputs from counter 78 via line 85 and line 91 may be viewed by referring to FIG. 5.

Selector 75 selects, as its output to be transferred via line 87, the state of one of the flip-flops (i.e., FF1 70, FF2 71, FF3 72, or FFN 73) received via line 81, line 82, line 83, or line 84 corresponding to the sampled subject conductors. The one selected is determined by the contents of counter 78 as received via line 85. Table B shows the relationship of the four possible values of counter 78 to the selection mode. FIG. 5 shows the state of line 87 as a function of time with a notation showing which flip-flop (i.e., FF1 70, FF2 71, FF3 72 or FFN 73) is selected. Notice also the time relationship of the state of line 87 to the signals on the other associated lines.

The contents of counter 78 are also transferred to RAM 79 via line 91. See FIG. 4. RAM 79 contains one addressable location or cell for each subject conductor to be sampled. In the embodiment pictured, RAM 79 contains four cells with each cell corresponding to one of the four subject conductors to be sampled. Each cell has the capacity to store a sufficient number of bits to provide the statistically determined confidence level required.

TABLE B

| COUNTER CONTENTS | STATE OF LINE 87 |
| --- | --- |
| 00 = 0 | SAME AS LINE 81 |
| 01 = 1 | SAME AS LINE 82 |
| 10 = 2 | SAME AS LINE 83 |

TABLE B-continued

| COUNTER CONTENTS | STATE OF LINE 87 |
| --- | --- |
| 11 = 3 | SAME AS LINE 84 |

As explained above, 16 bits is considered sufficient for this embodiment. Therefore, RAM 79 contains four cells of 16 bits each. The contents of counter 78 are received as a two-bit value via line 91 and coupled to the address input of RAM 79. This causes the one of four 16-bit cells of RAM 79 to be addressed corresponding to the two-bit contents of counter 78. RAM 79 transfers the 16-bit contents of the addressed cell to the output register, OREG 80, via line 92. OREG 80 transfers the 16-bit contents of the addressed cell to ADDER 77 via line 90. ADDER 77 receives the 16-bit contents of the addressed cell from OREG 80 via line 90 and the state of the one flip-flop selected by Selector 75 in response to the contents of counter 78 via line 87. If line 87 is high, ADDER 77 adds one to the 16-bit contents of the address cell received via line 90. If line 87 is low, ADDER 77 does not add one (or adds zero) to the 16-bit contents of the addressed cell received via line 90. ADDER 77 transfers the 16-bit resultant quantity to the input register, IREG 76, via line 88. IREG 76 transfers the resultant 16-bit quantity to RAM 79 via line 89. RAM 79 receives the 16-bit resultant quantity via line 89 at its write data input and stores the 16-bit resultant quantity into the one of four cells addressed by the contents of counter 78 as received via line 91. In this manner, the contents of each cell of RAM 79 are incremented (i.e., contents increased by one) for a sample taken at a time when the corresponding subject conductor is logically true. FIG. 5 provides the timing detail of this operation.

RAM 79 may be read by other means (not shown) to enable the measurements of the duty cycle of each subject conductor to be observed. As the reading of a random access memory such as RAM 79 is common in the art, no further detail is supplied, herein.

What is claimed is:

1. An apparatus for measuring the occurrence of digital events within a plurality of subject conductors comprising:
    periodic signaling means;
    a random number table;
    means responsively coupled to said periodic signaling means and said random number table for accessing a different entry of said random number table in response to said periodic signaling means;
    means responsively coupled to said accessing means for signaling that a sample should be taken based upon the value of said different entry of said random number table;
    means responsively coupled to said subject conductors and said signaling means for simultaneously sampling the state of each of said plurality of subject conductors when said signaling is that a sample should be taken; and
    means responsively coupled to said sampling means and said signaling means for recording said state of said subject conductors when said signaling is that a sample should be taken.

2. An apparatus for measuring the occurrence of digital events within a plurality of subject conductors comprising:
    a memory having a plurality of addressable locations wherein said addressable locations contain entries from a random number table;
    an oscillator;
    a counter responsively coupled to said oscillator and said memory to permit each cycle of said oscillator to cause said counter to sequentially address one of said plurality of said addressable locations of said memory;
    means responsively coupled to said memory for signaling that a sample should be taken based upon the contents of said one of said plurality of said addressable locations of said memory;
    means responsively coupled to said plurality of subject conductors and said signaling means for simultaneously sampling the state of each of said plurality of subject conductors when said signaling means indicates that a sample should be taken; and
    means responsively coupled to said sampling means and said signaling means for recording said state of each of said plurality of subject conductors when said signaling means indicates that a sample should be taken.

3. An apparatus for measuring the occurrence of digital events within a plurality of subject conductors according to claim 2 wherein said recording means comprises:
    a plurality of counters responsively coupled to said sampling means and said signaling means wherein each of said plurality of counters corresponds to one and only one of said plurality of subject conductors and wherein said each of said plurality of counters is incremented if and only if said signaling means indicates that a sample should be taken and said sampling means indicates said corresponding one of said plurality of said subject conductors is at a predefined state.

4. An apparatus for measuring the occurrence of digital events within a plurality of subject conductors according to claim 2 wherein said recording means comprises:
    a second memory having a plurality of addressable locations wherein each of said plurality of addressable locations of said second memory corresponds to one and only one of said plurality of subject conductors; and
    means responsively coupled to said sampling means, said signaling means and said second memory for incrementing said each of said plurality of addressable locations of said second memory if and only if said signaling means indicates that a sample should be taken and said sampling means indicates said corresponding one of said plurality of subject conductors is at a predefined state.

* * * * *